United States Patent
Dickinson et al.

[11] Patent Number: 5,951,058
[45] Date of Patent: Sep. 14, 1999

[54] PIPE JOINT

[75] Inventors: Alan J. Dickinson, Nottinghamshire; Giles C. Pettit, Nottingham, both of United Kingdom

[73] Assignee: Uponor Limited, United Kingdom

[21] Appl. No.: 09/011,230

[22] PCT Filed: Aug. 2, 1996

[86] PCT No.: PCT/GB96/01879

§ 371 Date: Sep. 22, 1998

§ 102(e) Date: Sep. 22, 1998

[87] PCT Pub. No.: WO97/06380

PCT Pub. Date: Feb. 20, 1997

[30] Foreign Application Priority Data

Aug. 5, 1995 [GB] United Kingdom .................... 9516112

[51] Int. Cl.[6] ...................................................... F16L 13/06
[52] U.S. Cl. ........................ 285/21.2; 285/104; 285/339; 285/374
[58] Field of Search ................................. 285/21.1, 21.2, 285/110, 111, 104, 374, 339, 340, 322

[56] References Cited

U.S. PATENT DOCUMENTS

| | | | |
|---|---|---|---|
| 4,530,520 | 7/1985 | Nyffeler et al. ........................... | 285/21 |
| 4,727,242 | 2/1988 | Barfield ................................... | 285/21.2 |
| 5,188,401 | 2/1993 | Staniforth ................................ | 285/322 |
| 5,269,569 | 12/1993 | Weber et al. ............................ | 285/104 |
| 5,297,824 | 3/1994 | Imhof et al. ............................. | 285/374 |

FOREIGN PATENT DOCUMENTS

| | | |
|---|---|---|
| 0235818 | 9/1987 | Germany . |
| 8911509 | 2/1990 | Germany . |
| 0691505 | 1/1996 | Germany . |
| 2161566 | 1/1986 | United Kingdom . |
| 2180310 | 3/1987 | United Kingdom . |

*Primary Examiner*—Anthony Knight
*Assistant Examiner*—Alison Pickard
*Attorney, Agent, or Firm*—Fish & Richardson P.C.

[57] ABSTRACT

A pipe joint which is made of a hollow body member having a passageway therethrough for receiving a pipe, a segmented gripper means positioned in a first circumferential tapered channel in the hollow body member and moveable axially within the passageway. The arrangement is such that, in use, when forces are applied tending to separate the pipe from the hollow body member the segmented gripper means can move axially along the tapered channel into gripping engagement with the pipe.

21 Claims, 2 Drawing Sheets

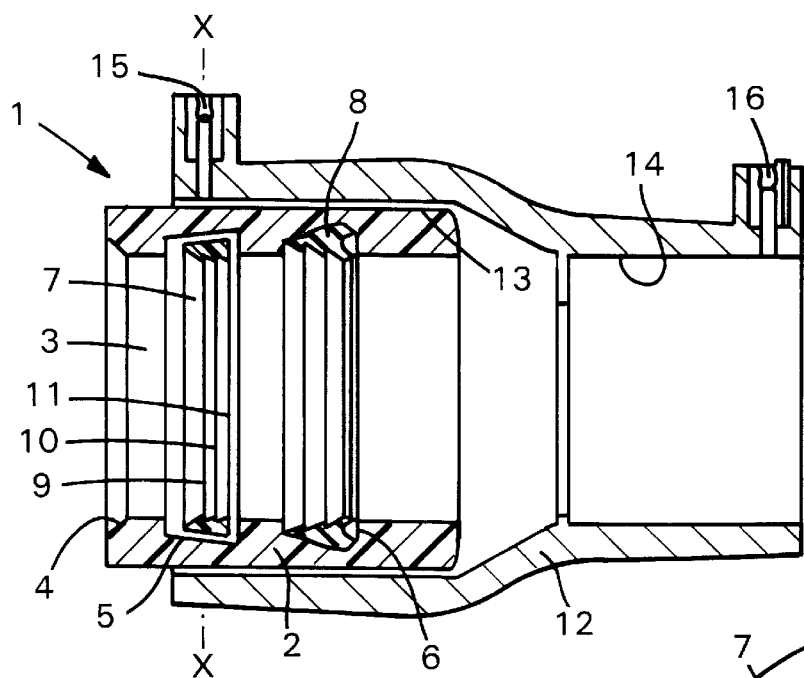
FIG. 1
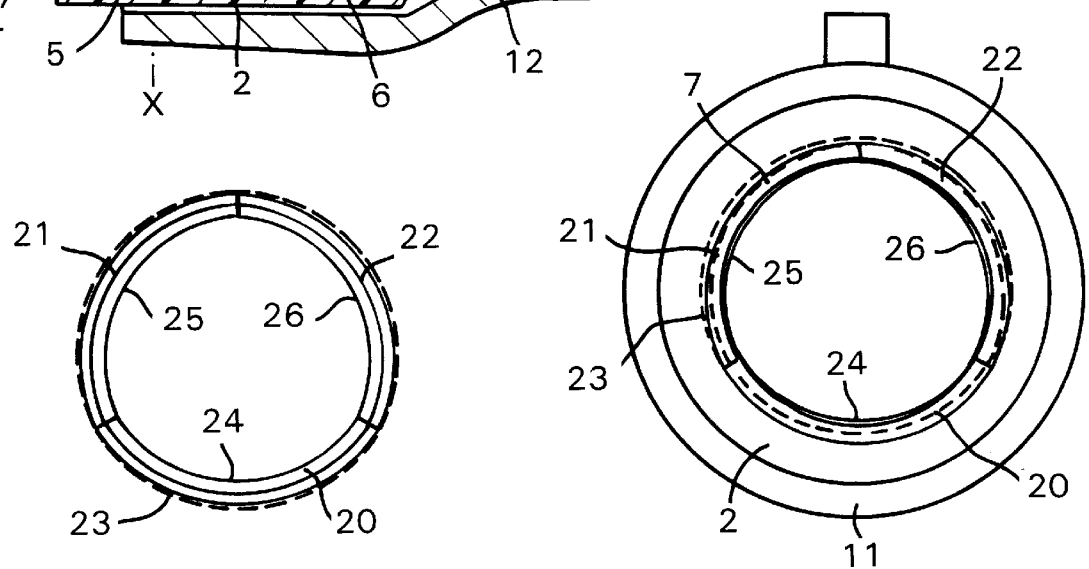
FIG. 2
FIG. 3
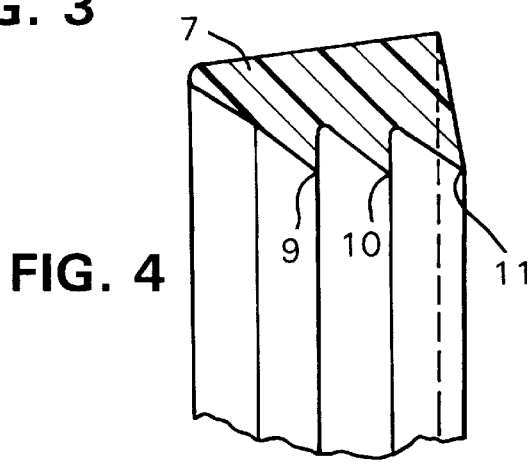
FIG. 4

PIPE JOINT

This is a continuation of International Patent Application No. PCT/GB96/01879, with an international filing date of Aug. 2, 1996, now pending.

This invention relates to pipe joints, and more particularly to a pipe joint comprising a hollow body member having a passageway therethrough for receiving a pipe into engagement therewith.

A very large number of pipe joints have been proposed comprising a hollow body member having a passageway therethrough for receiving a pipe, and gripper means positioned circumferentially in the passageway, comprising contractile rings, split locking rings, moveable resilient rings, and the like. Exemplary of such proposals are those described in GB2035495, GB2166508, GB2180310, GB2035495, GB1334339, GB1153177, GB1266603, U.S. Pat. No. 3,534,776, U.S. Pat. No. 3,600,010, U.S. Pat. No. 3,692,336 and U.S. Pat. No. 4,068,866, the entire disclosures of which are incorporated herein by reference for all purposes.

Many of the prior proposals incorporate gripping means comprising an annular ring which can move axially within the passageway and is positioned within a circumferential tapered channel in the hollow body member, so that, when forces act on the pipe tending to disengage it from the body member, the annular ring moves axially along the tapered channel so as to grip the pipe with a wedging action.

Typically such annular gripper rings give rise to problems in practice. For example, where the ring is a split resilient ring, it is difficult to insert it into the circumferential tapered channel, and when inserted it can easily become twisted so that it impedes the insertion of the pipe into the hollow member. In such circumstances, if the gripper ring becomes jammed, the pipe joint is useless and must be discarded. Even if the gripper ring does not jam, if it becomes twisted, or does not ride up to the top of the tapered channel properly, the external surface of the pipe may still become scored and damaged on entry.

According to the present invention, the above difficulties are obviated by the use of a segmented gripper means.

In a first aspect, the present invention provides a pipe joint comprising a hollow body member having a passageway therethrough for receiving a pipe, a segmented gripper means positioned in a first circumferential tapered channel in the hollow body member and moveable axially within the passageway, the arrangement being such that, in use, when forces are applied tending to separate the pipe from the hollow body member the segmented gripper means can move axially along the tapered channel into gripping engagement with the pipe.

Preferably the pipe joint is provided with sealing means which is preferably located in a second circumferential channel in the hollow body member.

The pipe joint can be used, for example, to join a pipe to another pipe, in a pipe coupling, or to join a pipe to a pipe fitting, or to another piece of apparatus. The invention can be used to join pipes of dissimilar materials, and, in a particularly preferred embodiment, the pipe joint can form part of a novel electrofusion fitting as will be more particularly described hereinafter.

The invention can be used to join pipes made from metal or plastics, but is particularly useful for joining plastic pipes, for example those used for carrying fluids such as gas or water, in, for example, utilities service pipe systems.

The hollow body member is preferably of generally cylindrical shape, and can, for example, comprise a generally cylindrical sleeve made from metal or plastics materials, or a combination thereof. Preferably the body member is made from a plastics material, which may be moulded, extruded, or otherwise formed into the desired shape. Suitable plastics materials include, for example, those made from olefin polymers, especially alpha olefins, such as, for example, homo-polymers and co-polymers of alpha olefins, for example, ethylene, propylene, butene-1 or 4-methylpentene-1; olefin co-polymers, for example, ethylene-propylene co-polymers; polymers of substituted olefins, for example, chlorinated polyethylenes; and polymers and co-polymers of vinyl monomers such as vinyl esters, for example ethylene-vinyl acetate and ethylene-ethyl acrylate co-polymers.

Preferably the passageway in the hollow body member is dimensioned to receive the pipe in relatively close fitting engagement. The hollow body member preferably is provided with two or more axially spaced apart circumferential channels for receiving respectively the segmented gripper means and one or more sealing means. The passageway can, if desired, be provided with a widened bore at its outlet, to facilitate the entry of the pipe into the passageway.

In preferred embodiments of the invention, the two or more circumferential channels are arranged such that the first circumferential tapered channel accommodating the segmented gripper means is located upstream of the channel or channels accommodating the sealing means, that is to say, the first circumferential tapered channel accommodating the segmented gripper means is nearer to the entrance of the passageway.

In the specification, by segmented gripper means is meant a gripper means comprising two or more segments which are preferably separate, although they could be pivotally joined or articulated at their ends. A preferred segmented gripper means according to the present invention comprises an annular ring, which can be divided into two or more separate segments. Preferably the segmented gripper means comprises three such segments.

The segments of the gripper means are preferably made from a resilient material, which can be a metal or plastics material. For joining softer plastics pipes, the segmented gripper means may comprise, for example, a polyolefin polymer material such as polyethylene, but for pipes made from harder materials the segmented gripper means is preferably made from an engineering plastics material, such as, for example, an acetal resin, or from a resilient metal such as spring steel.

The segmented gripper means, when assembled, preferably has a frusto-conical outer surface which is co-operable with the frusto-conical surface of the first circumferential tapered channel.

Preferably the segmented gripper means comprises a ring formed from two or more, and preferably three, separate segments, each of which is a segment of a circle having a larger radius than the largest radius of the first circumferential tapered channel. The segments, if desired, can be of uniform cross-section along their length, but preferably, they are wider at their ends and, if desired, also at their mid-portions, in order to provide a loose interference fit when the pipe is inserted into the passageway of the hollow body member.

The segments may have smooth inner surfaces or, alternatively, the inner surfaces may be roughened, or provided with teeth, to grip the outer surface of the pipe. Where such teeth are provided, these are preferably angled such that they permit easy entry of the pipe into the passageway, but can bite into the outer surface of the pipe in order to resist the removal thereof from the hollow body member.

In order to insert the segments of the gripper means into the first circumferential tapered channel, it is only necessary to press them into the channel, for example, by hand, so that they are resiliently deformed to a tighter radius than their free radius, the deformed radius lying between their undeformed radius and the maximum radius of the tapered bore of the channel, whereupon each segment exerts a force on the ends of the adjacent segment or segments when no pipe is inserted in the passageway of the hollow body member, and each of the segments are thereby resiliently retained in the first circumferential tapered channel. In a preferred embodiment, the segmented gripper means comprises a ring having three segments, and the segments are assembled by resiliently deforming two of the segments to conform to the radius of the tapered bore of the circumferential tapered channel and springing the third segment into the gap between the first two.

The spring action of the segments of the segmented gripper means provided by the force exerted by the ends of each on the other, tends to retain the gripper means segments at the top of the taper of the first circumferential channel, thereby allowing ready entry of the pipe into the hollow body member passageway.

The sum of the circumferential length of the segments of the gripper means is less than the circumferential length of the first circumferential tapered channel at its widest bore (at the top of the taper) and, also, preferably less than the circumferential length of the first circumferential tapered channel at its narrowest point. Preferably the arrangement is such that, as a pipe is pushed into the passageway of the hollow body member, it first contacts a central portion of each segment such that the centred portion is forced outwards towards the frusto-conical surface of the first circumferential tapered channel and the radius of curvature of each segment is reduced. Frictional engagement between at least the centre portions of the segments as the pipe is received in the passageway thereby maintains the segments of the gripper means at the wider bore end of the circumferential tapered channel. In this position the deformed segments tend to separate, such that there are small gaps between their adjacent ends.

However, should forces be applied tending to separate the pipe from the hollow body member, the frictional forces between the segments of the segmented gripper means and the pipe tend to move the segments axially along the first circumferential tapered channel towards the narrower bore end thereof, until they are wedged between the frusto-conical surface of the first circumferential tapered channel and the outer surface of the pipe. The teeth, if present, then grip into the pipe further increasing the strength of the connection. In this locking position, it is preferable that the ends of the segments do not touch each other, that is to say, the abovementioned gaps, though reduced, are still present.

If, for any reason, the frictional forces between the segments and the pipe outer surface are insufficient to drag the segments along the first circumferential tapered channel, it is possible to increase the interference fit of the segments with the pipe by reducing the radius on the inner face of each segment relative to its outer face and moving the centre of the arc of the radius on the inner face closer to the segment so that additional frictional force is applied at localised regions at the ends of each segment.

In an alternative embodiment, inwardly-directed projections may be provided at the mid-point and ends of each segment to provide a greater interference with the pipe.

In preferred embodiments of a pipe joint according to the invention, there is provided a sealing means located in a second circumferential channel in the hollow body member. The second circumferential channel can be tapered or otherwise profiled to accommodate the sealing means which is preferably an annular seal, made from, for example, an elastomer or a resilient polymeric material. Preferably the sealing means comprises an annular ring, the ring having a substantially U-shaped, V-shaped, or C-shaped cross section lying on one side, so that the arms of the U-shaped, V-shaped, or C-shaped cross section are pressed tightly respectively against the inner surface of the second circumferential channel and the outer surface of the pipe when the pipe is inserted into the passageway. Typical such sealing rings are disclosed in GB940833, GB1283489, GB2016630, GB2109078, and EPA073083, the entire disclosures of which are incorporated herein by reference for all purposes. Very good results have been obtained using an annular sealing ring made by Bode and Fosheda and sold under the trade name BODA SEAL.

In a particularly preferred embodiment, the pipe joint of the invention can form the inner portion of an electrofusion coupling. In this embodiment, the outer surface of the hollow body member is smooth, and is formed from a fusion bondable plastics material. The pipe joint is inserted into an electrofusion coupler, which comprises a hollow body member having an electrical heating element embedded in or adjacent to its inner wall. Typically, such heating elements comprise a coil of electrical resistance wire connected to terminals mounted on the outer surface of the electrofusion coupler. The body member of the electrofusion coupler comprises a fusible plastics material, for example, an olefin polymer or co-polymer. When the pipe joint of the invention is inserted into the electrofusion coupler and the electrical heating element is energised, a fusion bond is formed between the outer surface of the pipe joint and the inner surface of the body member of the electrofusion coupler.

The pipe joint of the invention thereby enables pipes made of dissimilar materials to be coupled together by a combination of mechanical and electrofusion techniques.

Certain embodiments of pipe joints according to the invention will now be described, by way of example only, with reference to the accompanying Drawings in which:

FIG. 1 shows, in sectional side elevation, a pipe joint according to the invention assembled in an electrofusion coupler;

FIG. 2 shows a section along the line X—X of FIG. 1;

FIG. 3 shows a plan view of a segmented gripper ring for use in a pipe joint according to the invention;

FIG. 4 shows a detail of the profile of a segment of the gripper ring of FIG. 3;

Figure 5:
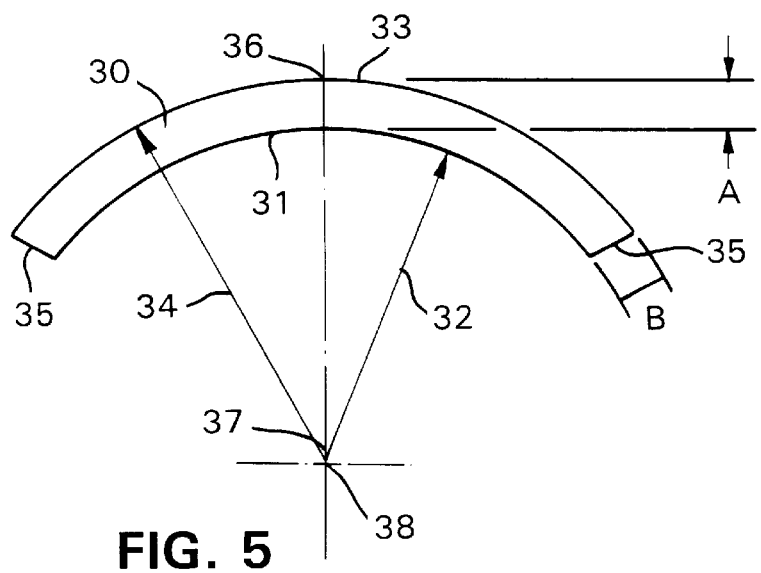
FIG. 5 shows a plan view of a first gripper ring segment modified to give improved frictional grip.

Referring firstly to FIG. 1, the pipe joint, illustrated generally at 1, comprises a cylindrical sleeve member 2, made from polyethylene, having a passageway 3 for the insertion of a pipe (not shown). The bore of the passageway 3 is widened with a taper 4 to permit easy insertion of the pipe. Within the passageway 3 there are situated first and second circumferential tapered channels 5 and 6, accommodating respectively a segmented gripper ring 7 and a V-shaped elastomeric sealing ring 8. The segmented gripper ring 7 is provided with circumferential teeth 9, 10, 11 and is made of a hard material, for example, acetal resin, so that the teeth can bite into the outer surface of, for example, a polyethylene pipe.

As shown in FIG. 1, the pipe joint 1 is inserted into an electrofusion coupler 12 having an electrical heating element (not shown) in the form of spiral coils of resistance wire embedded adjacent to the inner surfaces 13, 14 thereof, and connected to terminals 15, 16. The electrofusion coupler 11 is a standard reducing fitting supplied by Uponor Limited under the trade mark EASIGRIP.

Referring to FIGS. 2 and 3, the segmented gripper ring comprises segments 20, 21 and 22, each being shaped in the form of a segment of a circle whose diameter is greater than the larger diameter of the tapered channel 5. This can readily be seen from FIG. 3 where the circumference of the tapered channel 5 is indicated by broken line 23.

In order to assemble the pipe joint, the elastomeric sealing ring 8 is first inserted into the second circumferential tapered channel 6 by gentle pressure. The elastomeric sealing ring is of the type sold by Bode and Fosheda under the trade mark BODA SEAL.

Next, the gripper ring is assembled by inserting two of the segments, 20, 21, 22 into the tapered channel 5 and deflecting them back to the radius of the tapered bore. The third segment can then be sprung into the remaining gap. When in position in the channel 5, the gripper ring segments 20, 21 and 22 are such that the ends of each exert a spring force on the next thereby retaining the gripper ring in the channel. The effect of the force is to urge the segments of the gripper ring towards the larger diameter end 15 (see FIG. 1) of the tapered channel 5.

A detail of a segment of the gripper ring is shown in FIG. 4, in which the inwardly and rearwardly directed teeth 9, 10, 11 are illustrated on a larger scale.

Figure 6:
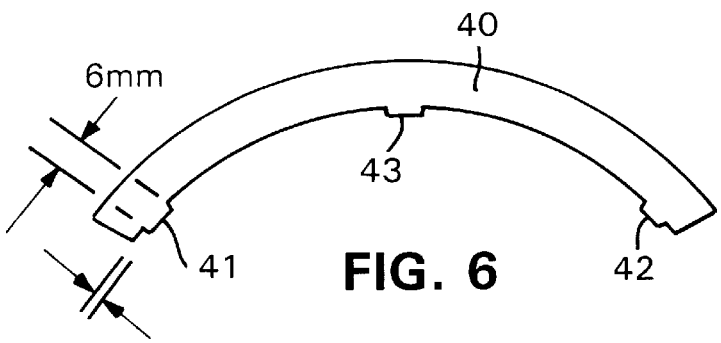
FIG. 6 shows a plan view of a second gripper ring segment modified to give improved frictional grip.

FIGS. 5 and 6 show two gripper ring segments modified to give improved frictional grip. In FIG. 5, the segment 30 has an inner surface 31 with a radius 32 that is smaller than the radius 34 of the outer surface 33. The centre 37 of the arc of radius 32 is offset along its centre line with respect to the centre of the arc of radius 34 and lies nearer to the segment 30. The result is that the width B of the segment at an end 35 is greater than the width A of the segment at its midpoint 36. Preferred width variations for different internal pipe joint diameters are as follows:

| Diameter | B - A |
|---|---|
| 90 mm | 0.8 mm |
| 125 mm | 1.0 mm |
| 180 mm | 1.4 mm |

FIG. 6 shows another embodiment of a modified gripper ring segment 40, which is provided with inwardly directed projections 41, 42 at its ends and a similar inwardly directed projection 43 at its mid-point. The projections have a length of about 6 mm and a height which is preferably determined by the internal pipe joint diameter as follows:

| Diameter | B - A |
|---|---|
| 90 mm | 0.8 mm |
| 125 mm | 1.0 mm |
| 180 mm | 1.4 mm |

Figure 7:
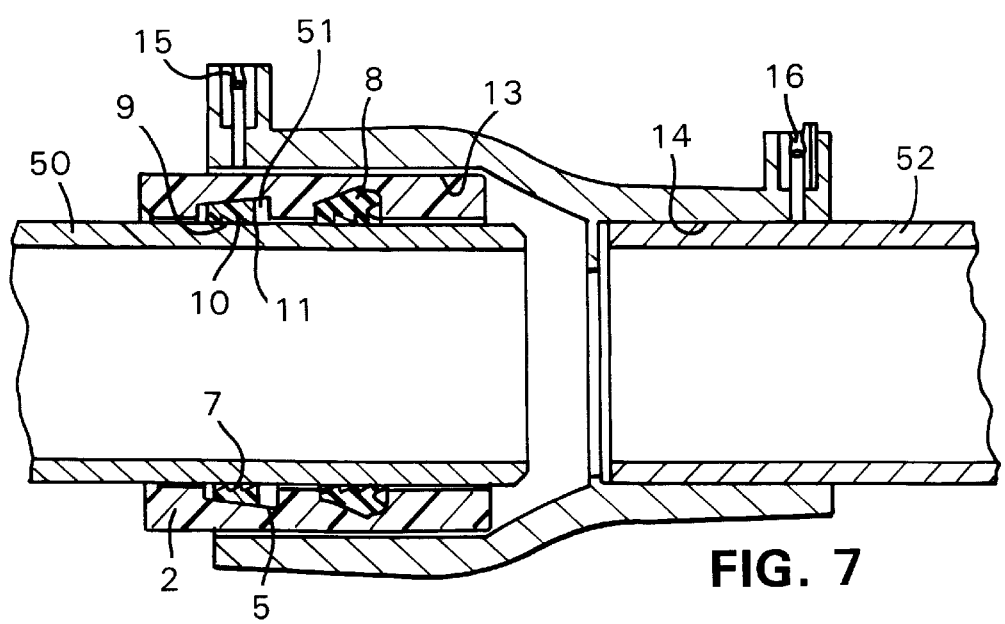
FIG. 7 shows, in sectional side elevation, an in-line pipe connection made using a pipe joint and electrofusion coupler as shown in FIG. 1.

An in-line pipe connection made using a pipe joint according to the invention and an electrofusion coupler, as illustrated in FIG. 1, is shown in FIG. 7.

In use, when a pipe 50 is inserted into the passageway 3, it contacts the mid-portions 24, 25 and 26 of the segments 20, 21 and 22, deflecting them towards the tapered outer surface, and towards the larger diameter end, of the tapered channel 5. When the pipe is fully inserted in body member 2, its outer surface is sealed by the elastomeric sealing ring 8 and held by the gripper ring teeth 9, 10 and 11. If the pipe 50 attempts to move out of the body member 2 the segments 20, 21, 22 of the gripper ring 7 tend to follow the pipe axially for a short distance until they become wedged between the tapered outer surface 51 of the tapered channel 5 and the outer surface of the pipe 50. At this position, any further movement causes the circumferential teeth 9, 10, 11 of the gripper ring 7 to bite harder into the outer surface of the pipe thereby arresting further outward movement.

The outer surface of the pipe joint 1 can readily be fused to the inner wall 13 of the electrofusion coupler 12 by connecting an appropriate source of electrical energy to the electrical terminals 15 and 16 in conventional fashion. At the same time, a second pipe 52 made from a fusible plastics material can be fusion bonded to the inner wall 14 of the electrofusion coupler 12. The standard reducing electrofusion fitting is thereby able to connect a pipe made from, for example, an infusible material, which is normally not capable of electrofusion, to a fusible plastics pipe.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

We claim:

1. A pipe joint comprising a hollow body member having a passageway therethrough for receiving a pipe, a segmented gripper means positioned in a first circumferential tapered channel in the hollow body member and moveable axially within the passageway to grip a pipe inserted in the hollow body member when forces are applied tending to separate the pipe from the hollow body member, characterised in that the segmented gripper means comprises a segmented annular ring, each segment of which is a segment of a circle having a larger radius than the largest radius of the first circumferential tapered channel, first circumferential tapered the ends of the segments bearing against one another in the channel.

2. A pipe joint according to claim 1, which is provided with a sealing means located in a second circumferential channel in the hollow body member.

3. A pipe joint according to claim 1, in which the hollow body member comprises a generally cylindrical sleeve member (2) made from metal or plastics materials, or a combination thereof.

4. A pipe joint according to claim 1, in which the hollow body member is provided with one or more axially spaced apart circumferential channels accommodating respectively one or more sealing means.

5. A pipe joint according to claim 4, in which the one or more circumferential channels are arranged such that the first circumferential tapered channel accommodating the segmented gripper means is located upstream of said one or more circumferential channels accommodating the one or more sealing means.

6. A pipe joint according to claim 1, in which the segmented gripper means comprises an annular ring divided into three segments.

7. A pipe joint according to claim 1, in which the segments of the gripper means are formed from a resilient metal or plastics material.

8. A pipe joint according to claim 1, in which the segmented gripper means, when assembled, has a frusto-conical outer surface which is cooperable with a frusto-conical surface of the first circumferential tapered channel.

9. A pipe joint according to claim 1, in which the segments are of generally uniform cross section along their length, but are wider at their ends, and optionally also at their mid portions.

10. A pipe joint according to claim 1, in which the segments of the segmented gripper means are provided with teeth in order to grip the outer surface of the pipe, the teeth being angled such that they permit easy entry of the pipe into the passageway, but can bite into the outer surface of the pipe in order to resist the removal thereof from the hollow body member.

11. A pipe joint according to claim 1, in which the segmented gripper means comprises an annular ring having three segments, and the segments are assembled by resiliently deforming two of the segments to conform to the radius of the tapered bore of the circumferential tapered channel and springing the third segment into the gap between the first two.

12. A pipe joint according to claim 1, in which, as a pipe is pushed into the passageway of the hollow body member, it first contacts a central portion of each segment such that the central portion is forced outwards towards the surface of the first circumferential tapered channel and the radius of curvature of the segments is reduced.

13. A pipe joint according to claim 1, in which the sum of the circumferential lengths of the segments of the gripper means is less than the circumferential length of the first circumferential tapered channel at its widest bore, and less than the circumferential length of the first circumferential tapered channel at its narrowest point.

14. A pipe joint according to claim 1, in which, when the segments of the segmented gripping means are moved along the tapered channel into gripping engagement with the pipe, the adjacent ends of the segments do not all touch each other.

15. A pipe joint according to claim 9, in which the radius on the inner face of each segment is reduced relative to its outer face and the centre of the arc of the radius on the inner face is closer to the segment so that additional frictional force is applied to the pipe at the ends of each segment.

16. A pipe joint according to claim 9, in which each segment is provided with inwardly-directed projections at its midpoint and at its ends.

17. A pipe joint according to claim 2, in which the sealing means comprises an annular seal formed from an elastomer, or a resilient polymeric material.

18. A pipe joint according to claim 17, in which the sealing means comprises an annular seal having a substantially U-shaped, V-shaped, or C-shaped cross section lying on one side, so that the arms of the U-shaped, V-shaped, or C-shaped cross section are pressed respectively against the inner surface of the second circumferential channel and the outer surface of the pipe, when the pipe is inserted into the passageway.

19. A pipe joint according to claim 1, adapted to be inserted into an electrofusion coupler.

20. A pipe joint according to claim 1, in combination with said electrofusion coupler.

21. An electrofusion coupling comprising a pipe joint according to claim 1.

* * * * *